United States Patent
Lautenschlager et al.

Patent Number: 6,067,356
Date of Patent: May 23, 2000

[54] METHOD OF ROUTING EMERGENCY CALLS

[75] Inventors: Wolfgang Lautenschlager, Weissach-Flacht; Hartmut Weik, Stuttgart; Lothar Krank; Uwe Stahl, both of Leonberg, all of Germany

[73] Assignee: Alcatel, Paris, France

[21] Appl. No.: 09/156,278

[22] Filed: Sep. 17, 1998

[30] Foreign Application Priority Data

Sep. 20, 1997 [DE] Germany ............... 197 41 576

[51] Int. Cl.⁷ ............... H04M 3/42; H04M 11/04
[52] U.S. Cl. ............... 379/207; 379/45
[58] Field of Search ............... 379/45, 201, 207

[56] References Cited

U.S. PATENT DOCUMENTS

| | | | |
|---|---|---|---|
| 4,051,327 | 9/1977 | Rigsby | 179/5 R |
| 4,689,811 | 8/1987 | Lennström et al. | 379/38 |
| 4,757,267 | 7/1988 | Riskin | 379/201 |
| 4,872,194 | 10/1989 | Trell | 379/40 |
| 5,347,568 | 9/1994 | Moody et al. | 379/45 |
| 5,388,145 | 2/1995 | Mulrow et al. | 379/45 |
| 5,748,717 | 5/1998 | Chan et al. | 379/207 |

FOREIGN PATENT DOCUMENTS

| | | |
|---|---|---|
| 0843456 | 5/1998 | European Pat. Off. . |
| 33 21 416 C2 | 12/1984 | Germany . |
| 3321416 | 12/1984 | Germany . |
| 35 90 468 T1 | 3/1986 | Germany . |
| 4106023 | 8/1992 | Germany . |
| 19507223 | 9/1996 | Germany . |
| 19614231 | 10/1997 | Germany . |
| 19625581 | 12/1997 | Germany . |
| 19639796 | 4/1998 | Germany . |

OTHER PUBLICATIONS

"Telefon–Notruf–Computer", K. Wagner, Funkschau, Nov. 1982, pp. 46–49.
WPI English abstract of RUPP DE 33 21 416, publ. Dec. 20 1984 & granted Jul. 4, 1985.
WPI English abstract of Lennström et al. DE 35 90 468 (Aug. 28, 1986)=USP 4,689,811.

*Primary Examiner*—Paul Loomis
*Attorney, Agent, or Firm*—Ware, Fressola, Van Der Sluys & Adolphson LLP

[57] ABSTRACT

A method of routing a call, especially an emergency call made to a uniform regional or national central phone call number, which is made by a telecommunications (TC) subscriber in a publicly accessible digital TC network, to the respective geographically responsible call center, includes the steps of transmitting, as part of a calling signal, an identification of the TC subscriber making the call, using the subscriber identification to retrieve, from a database containing at least a geographic location associated with each subscriber, the location of the calling subscriber, selecting a responsible call center nearest the location of the calling subscriber, and routing the call from the subscriber to the nearest responsible call center. The method has the advantage that, in spite of possible breakdown of previous associations between telephone number prefixes and geographic locations, the subscriber's location can be reliably determined with the help of a central calling number/location data base, and the call can be routed to the respective geographically responsible call center.

4 Claims, 1 Drawing Sheet

METHOD OF ROUTING EMERGENCY CALLS

FIELD OF THE INVENTION

The present invention concerns a method of routing calls to a uniform regional or national phone number, which are made by a telecommunications (TC) subscriber in a publicly accessible digital TC network, to the respective geographically responsible call center. Such a routing method is known, e.g. from DE 35 90 468 T1 and corresponding U.S. Pat. No. 4,689,811.

BACKGROUND OF THE INVENTION

Today, emergency calls are handled via uniform national phone numbers, such as 110 and 112 in Germany or 911 in North America. Upon dialing of these numbers, there is added to the call signal, for source identification purposes, a sequence of numbers that corresponds to the respective local network code (ONKZ). In accordance with this source or location code, i.e. the physical origin of an emergency call, the responsible exchange addresses the respective geographically responsible emergency call center, associated with the exchange.

Although thus far, due to a fixed association between the respective telephone number and an exchange at a specific location, the calling number already contains a clear position identification, in the future, due to allocation of telephone numbers among multiple different service providers, an association of the location of the respective terminal with the calling number will no longer be possible. There will also be TC subscribers who will want to take their phone number with them when they move, within a local network for example. This will make the determination of the correct geographically responsible emergency call center more difficult or impossible, if covered numbering is specified by the position of the exchanges in the existing local network, and the subscriber moves to another part of the city, with a different identification. Even in these cases, it must be ensured that the emergency call from an individual subscriber is forwarded to another, namely the geographically responsible, local emergency call center. Furthermore, there may be exchanges which must address several emergency call centers in different local networks.

In a forwarding method known from DE 35 90 468 T1 and U.S. Pat. No. 4,689,811, if any emergency call center has a night service connection or is out of service for any reason, a call from a TC subscriber is automatically diverted to another emergency call center. The subscriber's TC installation is programmed so that an emergency call goes to a predetermined first emergency call center. To that end, a code corresponding to the number of the first emergency call center is normally stored in the subscriber's installation. If, when a call is made, no acknowledgment signal is received from the first emergency call center, after a specified waiting period, routing to another predetermined second emergency call center is made. In case of a relocation of a subscriber, this routing method would require a corresponding change in the preprogrammed emergency call centers and their sequence.

A system for transmitting emergency calls is also known from DE 33 21 416 C2, RUPP, in which the emergency call contains an identification of the subscriber's device. Since the assignment of the identifications of the call numbers of the limited emergency call subscriber devices is stored in a call number memory, it can be detected, on the basis of this identification, from which of the many emergency call subscriber devices the call originates. However, in this transmission system as well, the emergency calls are routed, in accordance with their local network identification, to the associated respective geographically responsible emergency call centers.

Furthermore a method of transmitting emergency calls is known from U.S. Pat. No. 4,872,194 TRELL, whereby, when an emergency call is made, corresponding emergency call centers are dialed with the help of a discriminator. In this case, the selection of the respective responsible emergency call center takes place by means of the respective dialed telephone number.

Finally, a telephone alarm system is known from U.S. Pat. No. 4,051,327, RIGSBY, in which an encoded word information is stored in the memory of a transmitting or calling unit, which clearly identifies the transmitting or calling unit and also stores information such as, e.g., the telephone number of the receiving unit.

SUMMARY OF THE INVENTION

In contrast, the object of the present invention is to further develop a routing method of the type mentioned in the beginning, so that a call can be routed to the competent geographically responsible call center as a function of the calling TC subscriber's location.

The invention achieves this object in that an identification of the TC subscriber making the call, which is contained in the calling signal, is associated with the location of the calling TC subscriber by a device supported by a database (e.g. an intelligent network IN) in which at least his or her location is stored, that the nearest suitable responsible call center is selected by means of the associated location, and that the call is routed through to this responsible call center.

This routing method has the significant advantage that, even in case of breakdown of the geographic association of calling numbers with their prefixes or local exchanges, nevertheless, with the aid of a central calling number/location data base (intelligent network), an identification of the callers location can be reliably determined, and the call can be routed to the respective geographically responsible call center.

BRIEF FIGURE DESCRIPTION

FIG. 1 is a flowchart schematically illustrating the steps of the routing method of the present invention.

DETAILED DESCRIPTION

Figure 1:
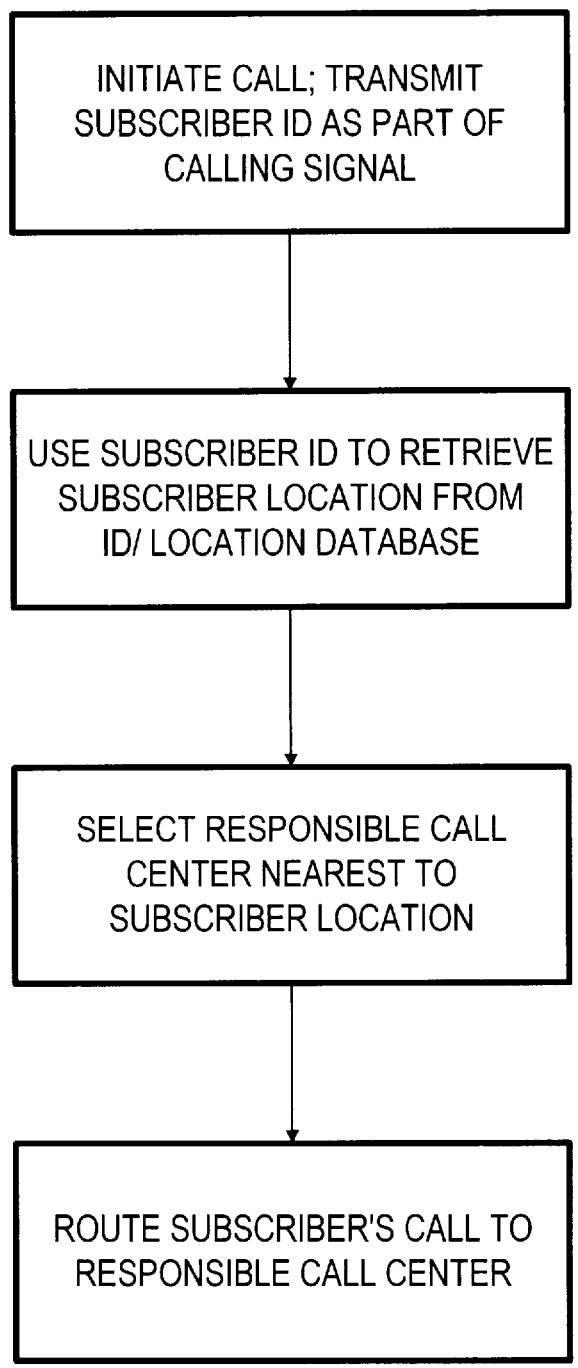

Emergency calls in particular are preferably forwarded to the nearest responsible emergency call center. The numbers that are dialed for the emergency calls, e.g. 110 or 112 or 911 (emergency call sequence), cause these calls or call signals to be first routed to the intelligent network. If the nearest concerned responsible emergency call center cannot be reached, is malfunctioning or out of order, the intelligent network reroutes the emergency call to another appropriate emergency call center.

In a particular version of the routing method, for identification of the TC subscriber making the call, one uses a calling number identification (line identification), which is transmitted with the call signal. A so-called Calling Line Identification (CLI) can be used to identify the line. This CLI identification is contained in the call signal and has so far been used, e.g. in ISDN lines, to indicate beforehand the telephone number of the calling party to the called party. Future services such as e.g. UPT (Universal Personal Telecommunication) can also be envisioned, whereby the subscriber receives a UPT number and can "log in" on any telephone of a fixed network. In that case, the line identification corresponds to the physical network address, i.e. for example the call number with which the UPT subscriber logged in.

When an emergency call is made, the system detects the emergency sequence in the call signal, and the calls are routed to the database or to the intelligent network. The call number/line identification of the calling or dialing subscriber is available e.g. as the CLI. The routing method of the invention makes possible a terminal-specific, and therefore correct, routing of calls to uniform regional or national central called numbers, especially emergency call numbers. Conventional TC subscriber devices can be used.

The function of the forwarding method of the invention is as follows:

1. A call signal with an emergency sequence, e.g. 110 or 112 or 911, triggers the intelligent network.
2. The database inquiry is triggered by the line identification (CLI) contained in the call signal, producing an individualized terminal location identification, generally a residence or address identification. This is preferably a two-stage translation, whereby the location is first determined from the line identification, and from it, the geographically responsible emergency call center.
3. In a possible further step, the geographically is responsible emergency call center, or the one which is ready to receive a call, is determined from the location identification. The distribution among different emergency call centers, as a function of time of day and day of the week, can take place via an IN (intelligent network) mechanism.
4. Routing of all call-relevant data to an emergency call center is possible on the basis of conventional terminals. Simple terminals are unable to produce a display at the emergency call center. By contrast, terminals with a display (Integrated Services Digital Network-ISDN, Asymmetric Digital Subscriber Line-ADSL) enable a minimum display at the emergency call center, where the transmission of the information can take place in-band (e.g. modem signalling) or out-of-band (e.g. ISDN user-to-user signalling).
5. The forwarding of all call-relevant data to a visual display station, i.e. the coupling to a data display unit e.g. a PC is possible, where the data to be displayed can be transmitted by signalling, or in parallel via an additional data network which is connected to the database.

Other embodiments can also be envisioned, such as e.g. an evaluation through the exchange or through access equipment.

What is claimed is:

1. A method of routing a call made to a uniform regional or national central phone number, which is made by a telecommunications (TC) subscriber in a publicly accessible digital TC network to the geographically responsible call center, comprising the steps of transmitting, as part of a calling signal, an identification of the TC subscriber making the call, using said subscriber identification to retrieve, from a database containing at least an individualized geographic location associated with each subscriber, independent of any prefix portion of said subscriber's telephone number, the location of the calling subscriber, selecting a responsible call center nearest said location of said calling subscriber, and routing said call from said subscriber to said nearest responsible call center.

2. A routing method as claimed in claim 1, further comprising routing emergency calls to a nearest responsible emergency call center.

3. A routing method according to claim 1, wherein said identification of said subscriber is a calling line identifier transmitted as part of said calling signal.

4. A routing method according to claim 2, wherein said identification of said subscriber is a calling line identifier transmitted as part of said calling signal.

* * * * *